US012772357B2

(12) United States Patent
Troeltzsch et al.

(10) Patent No.: US 12,772,357 B2
(45) Date of Patent: Oct. 20, 2026

(54) AGE-COMPENSATED DRIVING OF LIGHT-EMITTING DIODES OF A LIGHTING STRIP OF A MEDICAL DEVICE

(71) Applicant: Siemens Healthineers AG, Forchheim (DE)

(72) Inventors: Andreas Troeltzsch, Heroldsbach (DE); Harald Karl, Fuerth (DE); Arne Harriers, Uttenreuth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 70 days.

(21) Appl. No.: 19/041,088

(22) Filed: Jan. 30, 2025

(65) Prior Publication Data

US 2025/0247931 A1 Jul. 31, 2025

(30) Foreign Application Priority Data

Jan. 31, 2024 (DE) ..................... 10 2024 200 884.2

(51) Int. Cl.
*H05B 45/10* (2020.01)
*H05B 45/50* (2022.01)

(52) U.S. Cl.
CPC .................................... *H05B 45/50* (2020.01)

(58) Field of Classification Search
CPC ........ H05B 45/10; H05B 45/20; H05B 45/30; H05B 45/50; H05B 47/10
See application file for complete search history.

(56) References Cited

U.S. PATENT DOCUMENTS

2010/0219774 A1 9/2010 Bianco et al.
2017/0253336 A1 9/2017 Matsui et al.

FOREIGN PATENT DOCUMENTS

| | | | | |
|---|---|---|---|---|
| DE | 102016201568 | A1 | 8/2017 | |
| DE | 102017104665 | A1 | 9/2017 | |
| EP | 2242333 | A1 | 10/2010 | |
| EP | 3032920 | A2 | 6/2016 | |
| JP | 2004006622 | A * | 1/2004 | ............ H05B 45/58 |

* cited by examiner

*Primary Examiner* — Jimmy T Vu
(74) *Attorney, Agent, or Firm* — Harness, Dickey & Pierce, P.L.C.

(57) ABSTRACT

A medical device includes a lighting strip having a plurality of individually drivable light-emitting diodes, and a controller for the light-emitting diodes. The controller includes an interface configured to dynamically receive a request for an illumination state including a partial illumination state for each of the light-emitting diodes. The controller is configured to: individually determine respective drive levels for the light-emitting diodes such that an actual illumination state of a respective light-emitting diode corresponds to a respective partial illumination state; and drive the light-emitting diodes in accordance with the respective drive levels determined. When determining the respective drive levels the controller takes into account aging states of the light-emitting diodes.

20 Claims, 4 Drawing Sheets

AGE-COMPENSATED DRIVING OF LIGHT-EMITTING DIODES OF A LIGHTING STRIP OF A MEDICAL DEVICE

CROSS-REFERENCE TO RELATED APPLICATION(S)

The present application claims priority under 35 U.S.C. § 119 to German Patent Application No. 10 2024 200 884.2, filed Jan. 31, 2024, the entire contents of which is incorporated herein by reference.

FIELD

One or more embodiments of the present invention relate to an operating method for a medical device having a lighting strip comprising a plurality of individually drivable light-emitting diodes and a controller for the light-emitting diodes, wherein the controller receives a request for an illumination state via an interface.

One or more embodiments of the present invention further relate to a medical device, wherein the device has a lighting strip, wherein the lighting strip comprises a plurality of individually drivable light-emitting diodes and a controller for the light-emitting diodes, wherein the controller has an interface via which the controller receives a request for an illumination state.

BACKGROUND

In medical devices, use is often made of lighting strips that comprise a plurality of individually drivable light-emitting diodes and a controller for the light-emitting diodes. Lighting strips of said type are used for example in the transition area to the tunnel of CT systems and MR systems. The lighting strips do not serve the actual technical function of the respective medical device but are used as design elements.

Light-emitting diodes experience changes in their illumination characteristics over the course of their operating life. In particular, viewed over the course of their operating life, when driven at the same drive level (for example, at the same current), light-emitting diodes become gradually darker, i.e. they emit less and less light over the course of time. This is disadvantageous to an extent when different light-emitting diodes of the lighting strip age at different rates, since over the course of time this for example causes an initially consistent lumen output to change into an illumination state that subsequently exhibits an uneven brightness. This is particularly critical when a number of light-emitting diodes are combined to form a group of light-emitting diodes arranged in a common housing and are driven collectively in a coordinated manner in order to generate a particular color. For in such a case even minor deviations in the resulting illumination states of the light-emitting diodes of the respective group can have a major impact on the resulting color.

SUMMARY

An object of one or more embodiments of the present invention includes creating possible ways by which the shortcomings of the conventional art can be avoided.

In one example, at least this object may be achieved by way of an operating method having the features of one or more independent claims. Advantageous embodiments of the operating method are the subject matter of one or more dependent claims.

According to embodiments of the present invention, an operating method of the type cited in the introduction is embodied in that the controller receives the request for an illumination state dynamically via the interface and the requested illumination state for the light-emitting diodes comprises a partial illumination state in each case, the controller determines a respective drive level individually for the light-emitting diodes such that an actual illumination state of the respective light-emitting diode corresponds to the respective partial illumination state and drives the light-emitting diodes in accordance with the respectively determined drive level, and when determining the respective drive level, the controller takes into account an aging state of the respective light-emitting diode.

The medical device may be for example a CT system, an MR system, a C-arm X-ray system or a different large medical engineering appliance.

The respective partial illumination state corresponds to the state that the respective light-emitting diode is expected to assume, i.e. the light current (=output) that the respective light-emitting diode is intended to emit. The respective partial illumination state is the result of a respective drive level (=input) of the respective light-emitting diode. The respective drive level may in particular be a respective operating current of the respective light-emitting diode.

Generally, the controller reads out the aging states of the light-emitting diodes from a memory arranged on the lighting strip. Accordingly, the respective aging state is stored—individually for the respective light-emitting diode—in the memory. In addition, the controller determines changes in the aging states of the light-emitting diodes. The controller updates the aging states of the light-emitting diodes in accordance with the determined changes in the aging states and stores the (updated) aging states in the memory. The controller determines the changes in the aging states of the light-emitting diodes at least as a function of the drive level of the respective light-emitting diode.

For example, the controller can update the aging states—individually for the respective light-emitting diode—as a function of the operating time of the respective light-emitting diode (and irrespective of the magnitude of the drive level of the respective light-emitting diode). It is better if the controller, when updating the aging state, takes into account a combination of the operating times and the drive level, that, in other words, the aging process advances for example all the more rapidly, the stronger the respective light-emitting diode is driven. When determining the change in the respective aging state, the controller can if necessary also take into account the respective aging state itself. For example, a more rapid aging rate may occur toward the end of the lifespan of the respective light-emitting diode. In certain circumstances it is also possible, in addition also when the respective light-emitting diode is not being driven, to take into account as well an aging (also even if this is usually only very slight). If necessary, the controller, in the course of determining the change in the aging state of a particular light-emitting diode, can also take into account the driving states of other light-emitting diodes. This can make sense in particular when the light-emitting diodes are in each case combined into groups of light-emitting diodes and the light-emitting diodes of the respective group are arranged in a common housing. In this case, when determining the change in the aging state of a particular light-emitting diode, the controller can also take into account the drive level of the other light-emitting diodes of the same group. By "housing", within the context of embodiments of the present invention, is meant the respective assembly unit which is arranged on the lighting strip.

The aging states are stored in the memory in such a way that they are retained even when the energy supply to the lighting strip (and hence also to the controller) is switched off. Typically, they are stored in an EEPROM or a flash memory.

It is possible that the aging states are updated in the manner of a history, in other words that all the operating data from the past or the changes in the aging states resulting therefrom are stored. Preferably, however, only the integral is stored, i.e. the resulting aging states as such.

When determining the change in the aging state, the controller preferably takes into account time-invariant parameters of the light-emitting diodes that were predefined on a one-time only basis.

The parameters may for example comprise aging curves that describe the degree of the change in the aging state as a function of the drive level of the respective light-emitting diode. It is possible that the parameters are predefined individually for the respective light-emitting diode. In many cases the parameters can be predefined collectively for all the light-emitting diodes. If the light-emitting diodes comprise several types of light-emitting diodes, the parameters may, where appropriate, be specified jointly for all light-emitting diodes of the respective type. A situation of this kind may occur for example when the light-emitting diodes are in each case combined into groups of light-emitting diodes, the light-emitting diodes of the respective group are arranged in a common housing, and the light-emitting diodes of the respective group in each case emit light in different wavelengths from one another.

As already mentioned, the light-emitting diodes can in each case be combined into groups of light-emitting diodes in such a way that the light-emitting diodes of the respective group are arranged in a common housing and the light-emitting diodes of the respective group emit light in different wavelengths from one another. This embodiment is given in particular when the light-emitting diodes of the respective group are required to emit (resulting) white light or when the color of the (resulting) light emitted by the light-emitting diodes of the respective group is to be varied dynamically.

The light-emitting diodes of the respective group can in particular emit light in the colors red, blue and green such that by appropriate combination it is possible to emit light in the entire color spectrum and also to emit white light.

Generally, the effect of the aging of the light-emitting diodes is that, when driven at the same drive level, the light-emitting diodes emit less and less light, the older they are, i.e. the further the aging state of the respective light-emitting diode has advanced. Preferably, therefore, in order to provide a constant partial illumination state, the controller determines an ever stronger drive level of the respective light-emitting diode, the further the aging state of the respective light-emitting diode has advanced. As a result, the aging can be compensated for externally.

The respective partial illumination state is generally limited to a maximum value (=full illumination request). Similarly, the controller also limits the drive level of the respective light-emitting diode to a maximum value (=full drive level, for example maximum current). The limiting of the drive level to its maximum value is independent of the aging state of the respective light-emitting diode. As the drive level for the respective light-emitting diode, the controller preferably determines, at the beginning of the aging of the respective light-emitting diode, a drive level below the maximum value when the respective partial illumination state assumes its maximum value. As a result, even given an advanced aging state of the respective light-emitting diode, it is still possible to comply with a full illumination request.

In another example, at least the above-mentioned object is further achieved via a medical device having the features of one or more independent claims. Advantageous embodiments of the medical device are the subject matter of one or more dependent claims.

According to embodiments of the present invention, a medical device of the type cited in the introduction is embodied in that

- the controller receives the request for the illumination state dynamically via the interface and the requested illumination state for the light-emitting diodes in each case comprises a partial illumination state,
- the controller is embodied in such a way that it determines a respective drive level individually for the light-emitting diodes such that an actual illumination state of the respective light-emitting diode corresponds to the respective partial illumination state and drives the light-emitting diodes in accordance with the respectively determined drive level, and
- the controller is embodied in such a way that when determining the respective drive level it takes into account an aging state of the respective light-emitting diode.

The advantages achieved as a result correspond to those of the operating method.

The medical device may be embodied correspondingly to the advantageous embodiments of the operating method. In this case, too, the advantages achieved as a result correspond to those of the operating method.

The lighting strip is supplied with electrical power via a power supply device. Preferably, the lighting strip is assigned a power limiting device by which the electrical power fed to the lighting strip via the power supply device is limited to a predetermined maximum value irrespective of the requested illumination state. This enables safety-related regulations to be complied with in a simple manner. The maximum value may be determined as required. It may be rated at 15 W, for example.

BRIEF DESCRIPTION OF THE DRAWINGS

The above-described characteristics, features and advantages of this invention, as well as the manner in which these are achieved, will become clearer and more readily understandable in connection with the following description of the exemplary embodiments, which are explained in more detail in conjunction with the schematic drawings, in which.

DETAILED DESCRIPTION

Figure 1:
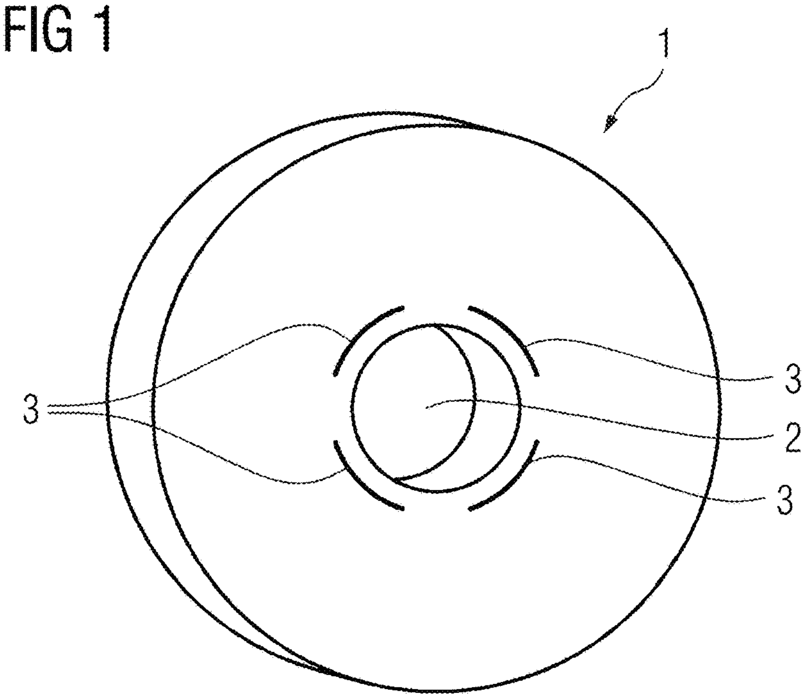
FIG. 1 shows a medical device.

FIG. 1 shows a schematic view of a medical device 1. The medical device 1 has a tunnel 2 through which a patient (not shown) can be introduced while lying on a patient couch. The tunnel 2 is generally present when the medical device 1 is a CT system or an MR system. The tunnel 2 is not required to be present in other embodiments of the medical device 1.

At this juncture the applicant points out that independent of the individual-related grammatical term usage—as in this case the term "patient"—individuals with male, female or other gender identities are always included within the term.

The device 1 has (at least) one lighting strip 3. According to FIG. 1, even multiple lighting strips 3 of such type are present. The lighting strips 3 may be straight or—as shown in FIG. 1—bowed or curved. Their length and width can be determined according to requirements. The basic technical circuitry layout of a lighting strip 3 is explained below in conjunction with FIG. 2.

Figure 2:
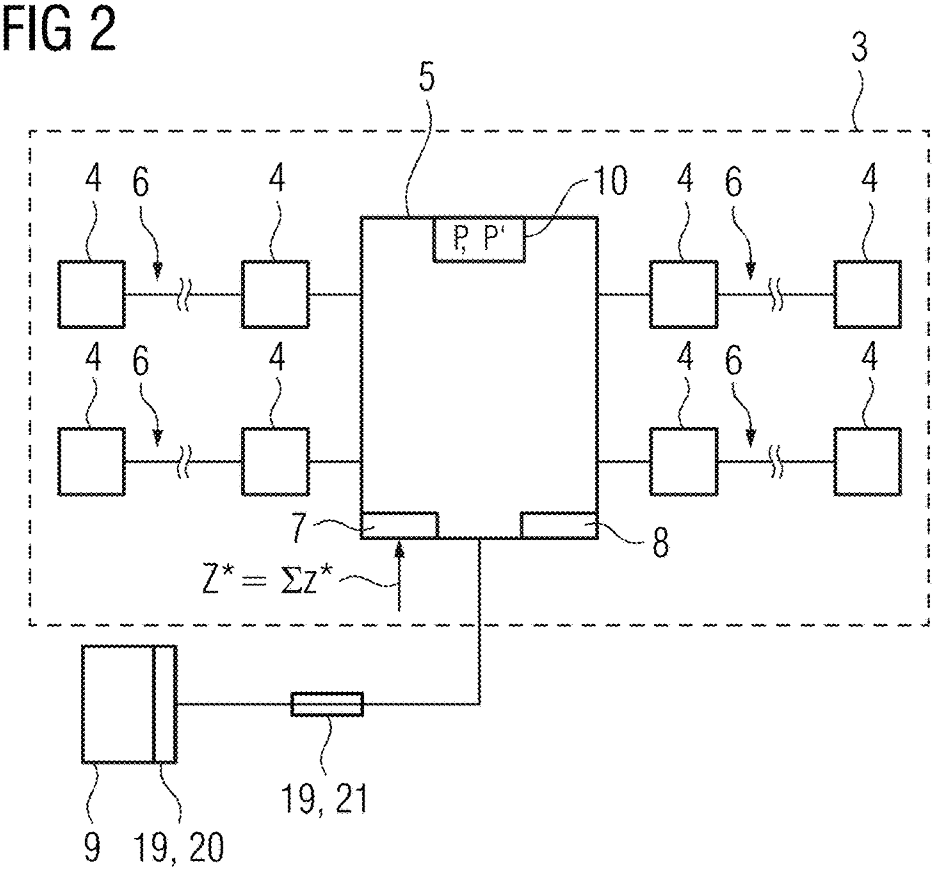
FIG. 2 shows a block diagram of a lighting strip.

According to FIG. 2, the respective lighting strip 3 comprises a plurality of light-emitting diodes 4 and a controller 5 for the light-emitting diodes 4. The light-emitting diodes 4 can be driven individually by the controller 5. According to FIG. 2, the light-emitting diodes 4 are arranged serially, one after another, in four strings 6 in each case. However, more or fewer strings 6 could also be present. The serially concatenated arrangement relates to the connection for data communication purposes between the controller 5 and the light-emitting diodes 4.

The controller 5 has an interface 7. The controller 5 receives a request for an illumination state Z* dynamically via the interface 7. The respective requested illumination state Z* comprises, as is indicated by a sigma sign in FIG. 2, a partial illumination state z* in each case for the light-emitting diodes 4. Accordingly, the respective illumination state Z* corresponds to the totality of the partial illumination states z* of the light-emitting diodes 4. The interface 7 is typically a serial interface.

Where appropriate, the controller 5 may have a further interface 8 to which the interface 7 of the controller 5 of a further lighting strip 3 can be connected. However, this is of secondary importance within the scope of the present invention. The further lighting strip 3 and its components are therefore not shown in FIG. 2.

The lighting strip 3 is additionally connected to a power supply device 9. The light-emitting diodes 4 and the controller 5, and consequently the lighting strip 3 in its entirety, are supplied with electrical power via the power supply device 9.

The controller 5 may be embodied as a microcontroller which executes a program. Regardless of the physical embodiment of the controller 5, however, the mode of operation of the controller 5 and consequently ultimately the mode of operation of the lighting strip 3, which is explained below in conjunction with FIG. 3, are generally known.

Figure 3:
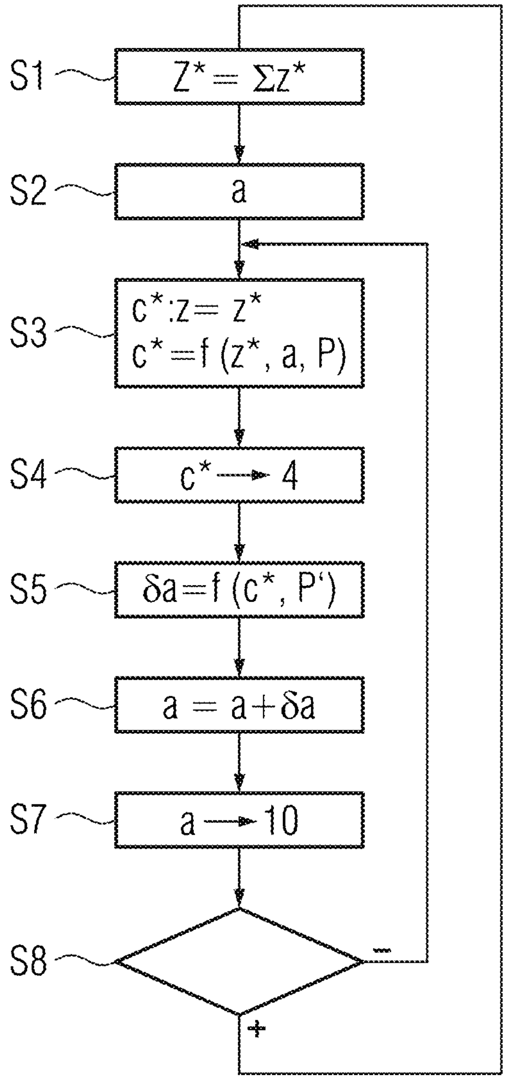
FIG. 3 shows a flowchart.

According to FIG. 3, the controller 5 receives the respective request for an illumination state Z* in a step S1. In addition, in a step S2, aging states a for the light-emitting diodes 4 are made known to the controller 5. The aging states a are given individually in each case for the respective light-emitting diode 4. For example, the controller 5 is able to read out the aging states a of the light-emitting diodes 4 from a memory 10 (see FIG. 2) which is arranged on the lighting strip 3. According to the view shown in FIG. 2, the memory 10 may be a component part of the controller 5.

In a step S3, the controller 5 determines—individually for the respective light-emitting diode 4—a respective drive level c*. The drive levels c* are determined in such a way that an actual illumination state z of the respective light-emitting diode 4 corresponds to the respective partial illumination state z* of the respective light-emitting diode 4. According to the illustration shown in step S3, when determining the respective drive level c*, the controller 5 takes into account the aging state a of the respective light-emitting diode 4 in addition to the respective partial illumination state z*. In a step S4, the controller 5 drives the light-emitting diodes 4 in accordance with the drive level c* determined in each case. Steps S3 and S4 are performed by the controller 5 individually for each of the light-emitting diodes 4.

Generally, the controller 5 additionally determines, in a step S5, changes δa in the aging states a of the light-emitting diodes 4. The change δa is determined individually for the respective light-emitting diode 4. The controller 5 determines the respective change δa at least as a function of the drive level c* of the respective light-emitting diode 4. In a step S6, the controller 5 updates the aging states a of the light-emitting diodes 4 in accordance with the determined changes δa in the aging states a. In a step S7, the controller 5 stores the (updated) aging states a in the memory 10.

When step S7 has been performed, the procedure illustrated in FIG. 3 is completed. In terms of approach, the controller 5 therefore returns to step S1. If necessary, however, step S7 can be followed by a step S8. If step S8 is present, the controller 5 proceeds from step S7 to step S8. In step S8, the controller 5 checks whether a new request for an illumination state Z* has been communicated to it. If a new request for an illumination state Z* is communicated to it, the controller 5 returns to step S1. Otherwise, the controller 5 returns from step S8 to step S3.

As shown in step S3, when determining the respective drive level c*, the controller 5 takes into account in addition to the partial illumination state z* not only the aging state a of the respective light-emitting diode 4 but also (first) parameters P, referred to hereinbelow as basic parameters. The basic parameters P are predefined on a one-time only basis and thereafter are time-invariant. During the manufacture of the lighting strip 3, they can for example be stored in the memory 10 or in a further independent memory which is likewise arranged on the lighting strip 3. The further memory is not shown in FIG. 2. According to FIG. 4, the basic parameters P generally comprise a family of curves 11. Each of the curves 11 is based on a specific aging state a of the respective light-emitting diode 4 and indicates which actual illumination state z results for the respective aging state a at which drive level c*. The basic parameters P may be stored individually for the light-emitting diodes 4. In many cases, however, the basic parameters P may also be determined uniformly for a number of light-emitting diodes 4—possibly even for all the light-emitting diodes 4.

Figure 4:
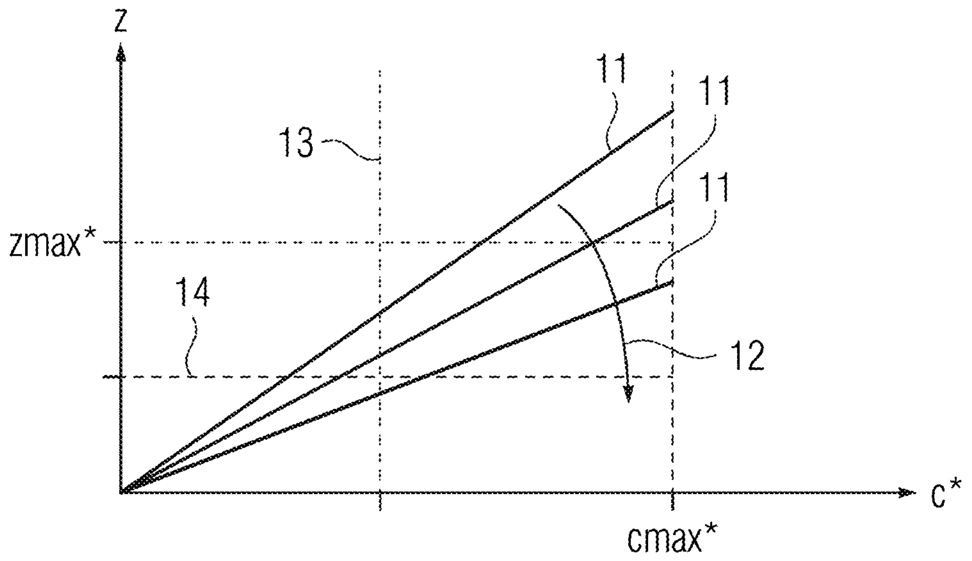
FIG. 4 shows a family of curves.

The arrow 12 in FIG. 4 indicates the direction of increasing aging. At a constant drive level c* (see the vertical dashed line 13 in FIG. 4), there therefore results, as can be seen, an ever weaker actual illumination state z, the further the aging of the respective light-emitting diode 4 has advanced. To compensate for this effect, in order to provide a constant partial illumination state z* (see the horizontal dashed line 14 in FIG. 4), the controller 5 therefore determines an all the more strong drive level c* for the respective light-emitting diode 4, the further the aging state a of the respective light-emitting diode 4 has advanced.

Figure 5:
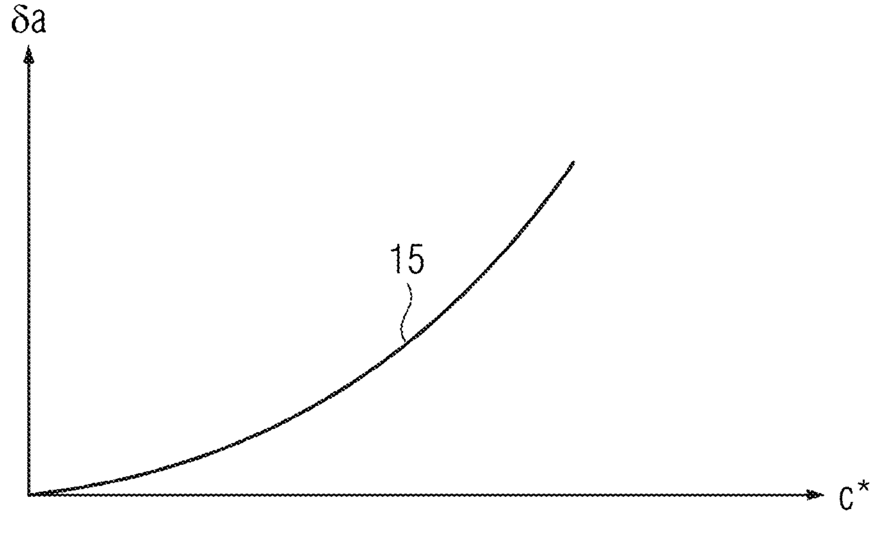
FIG. 5 shows a curve.

As shown in step S5, when determining the respective change δa in the respective aging state a, the controller 5 additionally takes into account not only the drive state c* of the respective light-emitting diode 4 but also (second) parameters P', referred to below as supplementary parameters. The supplementary parameters P'—just like the basic parameters P—are predefined on a one-time only basis and thereafter are time-invariant. They can for example be stored in the memory 10 or in the further independent memory during the manufacture of the lighting strip 3. According to FIG. 5, the supplementary parameters P' generally comprise a curve 15 which indicates the change δa in the aging state a as a function of the drive level c* of the respective light-emitting diode 4. The curve 15 is normalized to a specific time interval (for example 1 second). If necessary, a number of such curves 15 may also be present, the respective curve 15 being based on a respective aging state a.

Figure 6:
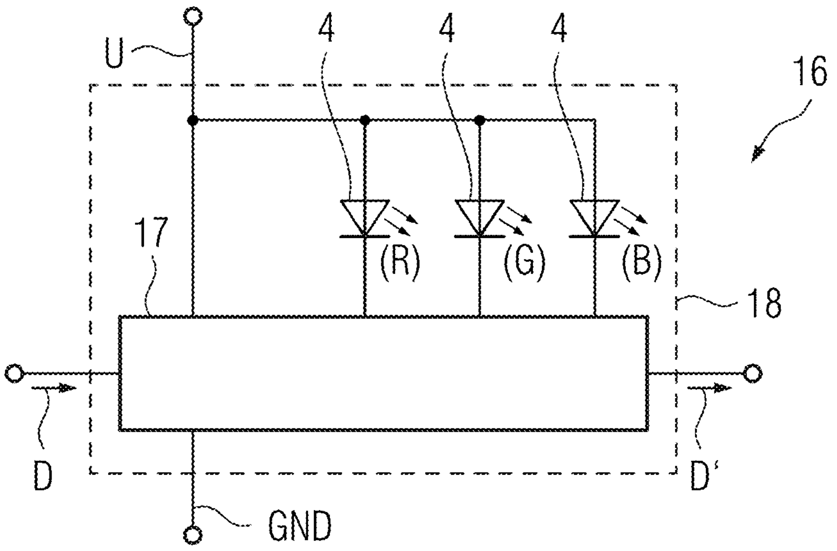
FIG. 6 shows a group of light-emitting diodes.

According to the schematic shown in FIG. 6, a number of light-emitting diodes 4 are combined into a respective group 16 of light-emitting diodes 4 in each case. The light-emitting diodes 4 of the respective group 16 emit light in different wavelengths from one another. This is indicated in FIG. 6 by the letters R, G, B, which stand for the colors red, green and blue. Generally, the respective group 16 is additionally assigned a control logic 17. The light-emitting diodes 4 of the respective group 16 are arranged—usually including the control logic 17—in a common housing 18.

The control logic 17 and the light-emitting diodes 4 of the respective group 16 are fed with a supply voltage U. The control logic 17 is additionally connected to a base potential GND. The control logic 17 is supplied with control signals D which comprise the drive levels c* for the light-emitting diodes 4 of the respective group 16. The control logic 17 thereupon drives the light-emitting diodes 4 of the respective group 16 accordingly. If necessary, further control signals D' which are intended for other groups 16 of light-emitting diodes 4 are also emitted by the control logic 17.

In the event of groups 16 of light-emitting diodes 4 being formed, the blocks shown in FIG. 2 and labeled with the reference sign 4 (for the light-emitting diodes) stand in each case for such a group 16 of light-emitting diodes 4.

As can be seen from FIG. 4, the respective partial illumination state is limited to a maximum value zmax*. The controller 5 also limits the drive level c* of the respective light-emitting diode 4 to a (further) maximum value cmax*. The controller 5 performs the limiting to the (further) maximum value cmax* irrespective of the aging state a of the respective light-emitting diode 4. As can be seen, the maximum value zmax* for the respective partial illumination state z* is determined in such a way that when the respective partial illumination state z* assumes its maximum value zmax* and the respective light-emitting diode 4 is still situated at the beginning of its aging process, the controller 5 determines, as the drive level c* of the respective light-emitting diode 4, a drive level c* which lies below the maximum value cmax*.

For operational safety reasons, a power limiting device 19 is assigned to the lighting strip 3 according to FIG. 2. Via the power limiting device 19, the electrical power supplied to the lighting strip 3 via the power supply device 9 is limited to a predetermined maximum value. The limiting is applied irrespective of the requested illumination state Z*. For example, the power limiting device 19 can comprise two subdevices 20, 21, one subdevice 20 being embodied as a voltage limiting device and the other subdevice 21 being embodied as a current limiting device. In this case the voltage limiting device 20 can limit the voltage delivered by the power supply device 9 to a predetermined value of 5 V, for example. The voltage limiting device 20 can be a component part of the power supply device 9. Similarly, the current limiting device 21 can limit the current supplied to the lighting strip 3 to a predetermined value of 3 A, for example. In the simplest case the current limiting device 21 can be embodied as a fuse. The numeric values cited for the voltage limiting and the current limiting are merely given purely by way of example.

To sum up, one or more embodiments of the present invention therefore relate to the following set of facts:

A medical device 1 has a lighting strip 3 comprising a plurality of individually drivable light-emitting diodes 4 and a controller 5 for the light-emitting diodes 4. Via an interface 7, the controller 5 dynamically receives a request for an illumination state Z* comprising a partial illumination state z* for each of the light-emitting diodes 4. The controller 5 determines a respective drive level c* individually for the light-emitting diodes 4 such that an actual illumination state z of the respective light-emitting diode 4 corresponds to the respective partial illumination state z*. The controller 5 drives the light-emitting diodes 4 in accordance with the drive level c* determined in each case. When determining the respective drive level c*, the controller 5 takes into account an aging state a of the respective light-emitting diode 4.

Embodiments of the present invention have many advantages. In particular, constant illumination characteristics can be maintained over the entire lifespan of the respective lighting strip 3. All the compensation takes place within the lighting strip 3. It is not necessary for these facts to be known to control electronics (not shown) which specify the respective requested illumination state Z* to the lighting strip 3.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been illustrated and described in more detail on the basis of the preferred exemplary embodiments, the present invention is not limited by the disclosed examples and other variations may be derived herefrom by the person skilled in the art without leaving the scope of protection of the present invention.

What is claimed is:

1. An operating method for a medical device including a lighting strip having a plurality of individually drivable light-emitting diodes and a controller for the light-emitting diodes, the operating method comprising:

dynamically receiving, at the controller via an interface, a request for an illumination state, which includes a partial illumination state for each of the light-emitting diodes;

individually determining, by the controller, respective drive levels for the light-emitting diodes such that an actual illumination state of a respective light-emitting diode corresponds to a respective partial illumination state; and driving, by the controller, the light-emitting diodes in accordance with the respective drive levels determined, wherein in determining the respective drive levels, the controller takes into account aging states of the light-emitting diodes.

2. The operating method as claimed in claim 1, further comprising:

reading out, by the controller, the aging states of the light-emitting diodes from a memory arranged on the lighting strip;

determining changes in the aging states of the light-emitting diodes at least as a function of the respective drive levels of the light-emitting diodes;

updating the aging states of the light-emitting diodes in accordance with the changes in the aging states; and storing the updated aging states in the memory.

3. The operating method as claimed in claim 2, wherein the determining changes in the aging states takes into account time-invariant parameters of the light-emitting diodes, the time-invariant parameters defined on a one-time only basis.

4. The operating method as claimed in claim 1, wherein the light-emitting diodes are combined into groups of light-emitting diodes, wherein the light-emitting diodes of a respective group are arranged in a common housing, and wherein the light-emitting diodes of the respective group emit light at different wavelengths from one another.

5. The operating method as claimed in claim 1, further comprising:

increasing a respective drive level of a respective light-emitting diode for a constant partial illumination state as an aging state of the respective light-emitting diode advances.

6. The operating method as claimed in claim 5, wherein the respective drive level is limited to a maximum value irrespective of the aging state of the respective light-emitting diode, and as the respective drive level of the respective light-emitting diode at the beginning of aging of the respective light-emitting diode, a drive level below the maximum value is determined when the respective partial illumination state assumes a further maximum value.

7. A medical device, comprising:

a lighting strip including a plurality of individually drivable light-emitting diodes; and a controller for the light-emitting diodes, the controller having an interface configured to dynamically receive a request for an illumination state including a partial illumination state for each of the light-emitting diodes; and wherein the controller is configured to individually determine respective drive levels for the light-emitting diodes such that an actual illumination state of a respective light-emitting diode corresponds to a respective partial illumination state, and drive the light-emitting diodes in accordance with the respective drive levels determined, wherein when determining the respective drive levels the controller takes into account aging states of the light-emitting diodes.

8. The medical device as claimed in claim 7, wherein the controller is configured to read out the aging states of the light-emitting diodes from a memory arranged on the lighting strip, determine changes in the aging states of the light-emitting diodes at least as a function of the respective drive levels of the light-emitting diodes, update the aging states of the light-emitting diodes in accordance with the changes in the aging states, and store the updated aging states in the memory.

9. The medical device as claimed in claim 8, wherein the controller has a memory for time-invariant parameters of the light-emitting diodes, wherein the time-invariant parameters are defined on a one-time only basis, and wherein the controller is configured to take the time-invariant parameters of the light-emitting diodes into account when determining the changes in the aging states.

10. The medical device as claimed in claim 7, wherein the light-emitting diodes are combined into groups of light-emitting diodes, wherein the light-emitting diodes of a respective group are arranged in a common housing, and wherein the light-emitting diodes of the respective group are configured to emit light in different wavelengths from one another.

11. The medical device as claimed in claim 7, wherein the controller is configured to increase the respective drive level of the respective light-emitting diode for a constant partial illumination state as the aging state of the respective light-emitting diode advances.

12. The medical device as claimed in claim 11, wherein the respective partial illumination state is limited to a maximum value, and the controller is configured to limit the respective drive level of the respective light-emitting diode to a maximum value irrespective of the aging state of the respective light-emitting diode, and as the respective drive level of the respective light-emitting diode at the beginning of aging of the respective light-emitting diode, determine a drive level below the maximum value when the respective partial illumination state assumes a further maximum value.

13. The medical device as claimed in claim 7, wherein the lighting strip is supplied with electrical power via a power supply device, and wherein the lighting strip is assigned a power limiting device configured to limit the electrical power fed to the lighting strip via the power supply device to a maximum value irrespective of a requested illumination state.

14. The operating method as claimed in claim 2, wherein the light-emitting diodes are combined into groups of light-emitting diodes, wherein the light-emitting diodes of a respective group are arranged in a common housing, and wherein the light-emitting diodes of the respective group emit light at different wavelengths from one another.

15. The operating method as claimed in claim 14, further comprising:

increasing a respective drive level of a respective light-emitting diode for a constant partial illumination state as an aging state of the respective light-emitting diode advances.

16. The operating method as claimed in claim 2, further comprising:

increasing a respective drive level of a respective light-emitting diode for a constant partial illumination state as an aging state of the respective light-emitting diode advances.

17. The medical device as claimed in claim 8, wherein the light-emitting diodes are combined into groups of light-emitting diodes, wherein the light-emitting diodes of a respective group are arranged in a common housing, and wherein the light-emitting diodes of the respective group are configured to emit light in different wavelengths from one another.

18. The medical device as claimed in claim 17, wherein the controller is configured to increase the respective drive level of the respective light-emitting diode for a constant partial illumination state as the aging state of the respective light-emitting diode advances.

19. The medical device as claimed in claim 8, wherein the controller is configured to increase the respective drive level of the respective light-emitting diode for a constant partial illumination state as the aging state of the respective light-emitting diode advances.

20. The medical device as claimed in claim 8, wherein the lighting strip is supplied with electrical power via a power supply device, and wherein the lighting strip is assigned a power limiting device configured to limit the electrical power fed to the lighting strip via the power supply device to a maximum value irrespective of a requested illumination state.

* * * * *